United States Patent
Innocenzi et al.

(10) Patent No.: US 12,280,737 B1
(45) Date of Patent: *Apr. 22, 2025

(54) REMOTE VEHICLE IMMOBILIZER

(71) Applicant: Samsara Inc., San Francisco, CA (US)

(72) Inventors: Michael Luis Innocenzi, San Francisco, CA (US); Elias Ray Dykaar, San Francisco, CA (US); Maxwell Anton Dergosits, San Francisco, CA (US); Ingo Gerhard Wiegand, San Francisco, CA (US)

(73) Assignee: Samsara Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/601,132

(22) Filed: Mar. 11, 2024

Related U.S. Application Data

(63) Continuation of application No. 18/174,949, filed on Feb. 27, 2023, now Pat. No. 11,975,685, which is a
(Continued)

(51) Int. Cl.
| | |
|---|---|
| *H04W 4/48* | (2018.01) |
| *B60R 25/045* | (2013.01) |
| *B60R 25/20* | (2013.01) |
| *G07C 5/02* | (2006.01) |
| *H04W 4/021* | (2018.01) |
| *H04W 68/00* | (2009.01) |

(52) U.S. Cl.
CPC ............ *B60R 25/045* (2013.01); *B60R 25/20* (2013.01); *G07C 5/02* (2013.01); *H04W 4/021* (2013.01); *H04W 4/48* (2018.02); *H04W 68/00* (2013.01)

(58) Field of Classification Search
CPC ....... B60R 25/045; B60R 25/20; B60R 25/30; B60R 2025/0405; G07C 5/02; G07C 5/008; H04W 4/021; H04W 4/48; H04W 68/00
See application file for complete search history.

(56) References Cited

U.S. PATENT DOCUMENTS

| | | |
|---|---|---|
| 4,914,038 A | 4/1990 | Jewitt |
| 5,956,484 A | 9/1999 | Rosenberg et al. |

(Continued)

OTHER PUBLICATIONS

Stockar et al., Optimal control for Plug-in Hybrid Electric Vehicle applications, 2010, IEEE, gg. 5024-5030 (Year: 2010).*
(Continued)

*Primary Examiner* — McDieunel Marc
(74) *Attorney, Agent, or Firm* — Schwegman Lundberg & Woessner, P.A.

(57) ABSTRACT

Systems, methods, and non-transitory computer-readable media for a remote vehicle immobilizer. A network gateway device receives a command from a remote computing device to modify a configuration of an electronic switch from a first configuration to a second configuration. The electronic switch is positioned in a conducting path between a starter motor of the vehicle and a battery of the vehicle. In response to receiving the command, the network gateway device transmits a signal to the electronic switch via a two-way communication channel connecting the network gateway device to the electronic switch. The signal causes the electronic switch to modify the configuration of the electronic switch from the first configuration to the second configuration.

20 Claims, 10 Drawing Sheets

Related U.S. Application Data continuation of application No. 17/064,953, filed on Oct. 7, 2020, now Pat. No. 11,618,410, which is a continuation of application No. 16/796,755, filed on Feb. 20, 2020, now Pat. No. 10,843,659.

(56) References Cited

U.S. PATENT DOCUMENTS

| | | | |
|---|---|---|---|
| 6,535,793 | B2 | 3/2003 | Allard |
| 7,183,942 | B2 | 2/2007 | Rock et al. |
| 7,421,334 | B2 | 9/2008 | Dahlgren et al. |
| 7,432,800 | B2 | 10/2008 | Harter, Jr. et al. |
| 7,589,643 | B2 | 9/2009 | Dagci et al. |
| 8,630,748 | B2 | 1/2014 | Hermann et al. |
| 8,954,230 | B2 | 2/2015 | Kalinadhabhotla et al. |
| 9,430,936 | B2 | 8/2016 | Petite |
| 9,921,290 | B2 | 3/2018 | Kane et al. |
| 9,927,807 | B1 | 3/2018 | Ganjoo |
| 10,096,176 | B1 * | 10/2018 | Namineni .............. G07C 5/008 |
| 10,843,659 | B1 * | 11/2020 | Innocenzi .............. B60R 25/045 |
| 10,875,420 | B2 * | 12/2020 | Grimm .................. B60L 53/65 |
| 11,167,422 | B2 | 11/2021 | Rosenstein et al. |
| 11,179,856 | B2 | 11/2021 | Rosenstein et al. |
| 11,618,410 | B2 * | 4/2023 | Innocenzi .............. H04W 68/00 701/45 |
| 11,975,685 | B1 * | 5/2024 | Innocenzi .............. B60R 25/045 |
| 2018/0281188 | A1 | 10/2018 | Rosenstein et al. |
| 2021/0261090 | A1 | 8/2021 | Innocenzi et al. |

OTHER PUBLICATIONS

Ochiai et al., Power system modeling and performance evaluation of series/ parallel-type plug-in hybrid electric vehicles, 2010, IEEE, p. 1-6 (Year: 2010).*

Mahmoudi et al., An overview of electric Vehicle concept and power management strategies, 2014, IEEE, p. 1-8 (Year: 2014).*

Atallah et al., A Reinforcement Learning Technique for Optimizing Downlink Scheduling in an Energy-Limited Vehicular Network, 2017, IEEE, p. 1-10 (Year: 2017).*

"U.S. Appl. No. 16/796,755, Examiner Interview Summary mailed May 6, 2020", 3 pgs.

"U.S. Appl. No. 16/796,755, Non Final Office Action mailed Apr. 22, 2020", 19 pgs.

"U.S. Appl. No. 16/796,755, Notice of Allowance mailed Jul. 30, 2020", 8 pgs.

"U.S. Appl. No. 16/796,755, Response filed Jul. 14, 2020 to Non Final Office Action mailed Apr. 22, 2020", 12.

"U.S. Appl. No. 17/064,953, Ex Parte Quayle Action mailed Nov. 16, 2022", 4 pgs.

"U.S. Appl. No. 17/064,953, Non Final Office Action mailed Oct. 11, 2022", 12 pgs.

"U.S. Appl. No. 17/064,953, Notice of Allowance mailed Nov. 29, 2022", 8 pgs.

"U.S. Appl. No. 17/064,953, Response filed Nov. 3, 2022 to Non Final Office Action mailed Oct. 11, 2022", 8 pgs.

"U.S. Appl. No. 17/064,953, Response filed Nov. 17, 2022 to Ex Parte Quayle Action mailed Nov. 16, 2022", 2 pgs.

"U.S. Appl. No. 18/174,949, Non Final Office Action mailed Oct. 24, 2023", 12 pgs.

"U.S. Appl. No. 18/174,949, Notice of Allowance mailed Dec. 20, 2023", 8 pgs.

"U.S. Appl. No. 18/174,949, Preliminary Amendment filed May 25, 2023"

"U.S. Appl. No. 18/174,949, Response filed Nov. 30, 2023 to Non Final Office Action mailed Oct. 24, 2023", 8 pgs.

Al-Sheikh, "Power electronics interface configurations for hybrid energy storage in hybrid electric vehicles", IEEE, (2014), 122-126.

Barba-Maza, L. M., et al., "Development of a Breathalyzer for Car Drivers", IEEE International Autumn Meeting on Power, Electronics and Computing, (2016), 4 pgs.

Hamada, Yasufumi, et al., "Development of contact-type alcohol checking system", SICE Annual Conference, (Aug. 2010), 4 pgs.

Hasan, et al., "A PM Brushless DC Starter/Generator System for a Series-Parallel 2x2 Hybrid Electric Vehicle", IEEE, (2007), 1686-1693.

Holden, Trevor, et al., "Hybrid security for hybrid vehicles exploring smart grid technology, powerline and wireless communication,", IEEE, (2011), 5 pgs.

Hu, et al., "CAN-based passenger car starter information integrated control method and its implementation", IEEE, (2009), 1023-1208.

Lu, et al., "High Efficiency Energy Storage System Design for Hybrid Electric Vehicle with Motor Drive Integration", IEEE, (2006), 2560-2567.

Mottely, et al., "A Delayed-Repeater Satellite Communication System of Advanced Design", IEEE, (1960), 195-207.

Roscher, Alentin, et al., "Synchronisation using Wireless Trigger-Broadcast for Impedance Spectroscopy of Battery Cells", 2015 IEEE, (2015), 6 pages.

Seco, Ines, et al., "Preliminarystudy of a non-invasive portable device for continuous monitoring of blood alcohol concentration", Twelfth International Conference on Sensing Technology (ICST), (2018), 7 pgs.

Spillane, et al., "Supervisory control of a HV integrated starter-alternator with ultracapacitor support within the 42 V automotive electrical system", IEEE, (2003), 1111-1117.

Zhou, et al., "Multi-function bi-directional battery charger for plug-in hybrid electric vehicle application", IEEE, (2009), 3930-3936.

* cited by examiner

US 12,280,737 B1

REMOTE VEHICLE IMMOBILIZER

PRIORITY APPLICATION

This application is a continuation of U.S. patent application Ser. No. 18/174,949, filed Feb. 27, 2023, which is a continuation of U.S. patent application Ser. No. 17/064,953, filed Oct. 7, 2020, which is a continuation of U.S. patent application Ser. No. 16/796,755, filed Feb. 20, 2020, the disclosures of which are incorporated herein in their entirety by reference.

TECHNICAL FIELD

Embodiments of the present subject matter relate generally to vehicles and, more specifically, to a remote vehicle immobilizer.

BACKGROUND

Restricting use of vehicles, such as by limiting the conditions under which the vehicles may be operated, is useful in various applications. For example, restricting use of a vehicle can ensure that the vehicle is not operated under unsafe conditions, such as by an unknown, intoxicated, or otherwise unfit operator. Further, restricting use of a vehicle can provide protection that the vehicle is not operated in an unsafe, unauthorized or otherwise unwanted geographic location. While providing these types of restrictions is beneficial, implementation may be difficult as monitoring and controlling use of a vehicle is often not possible once the vehicle has left the control of the party implementing restrictions. For example, a vehicle rental service or fleet manager cannot control how a vehicle is operated once the vehicle has been rented or assigned to a driver. Accordingly, improvements are needed.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
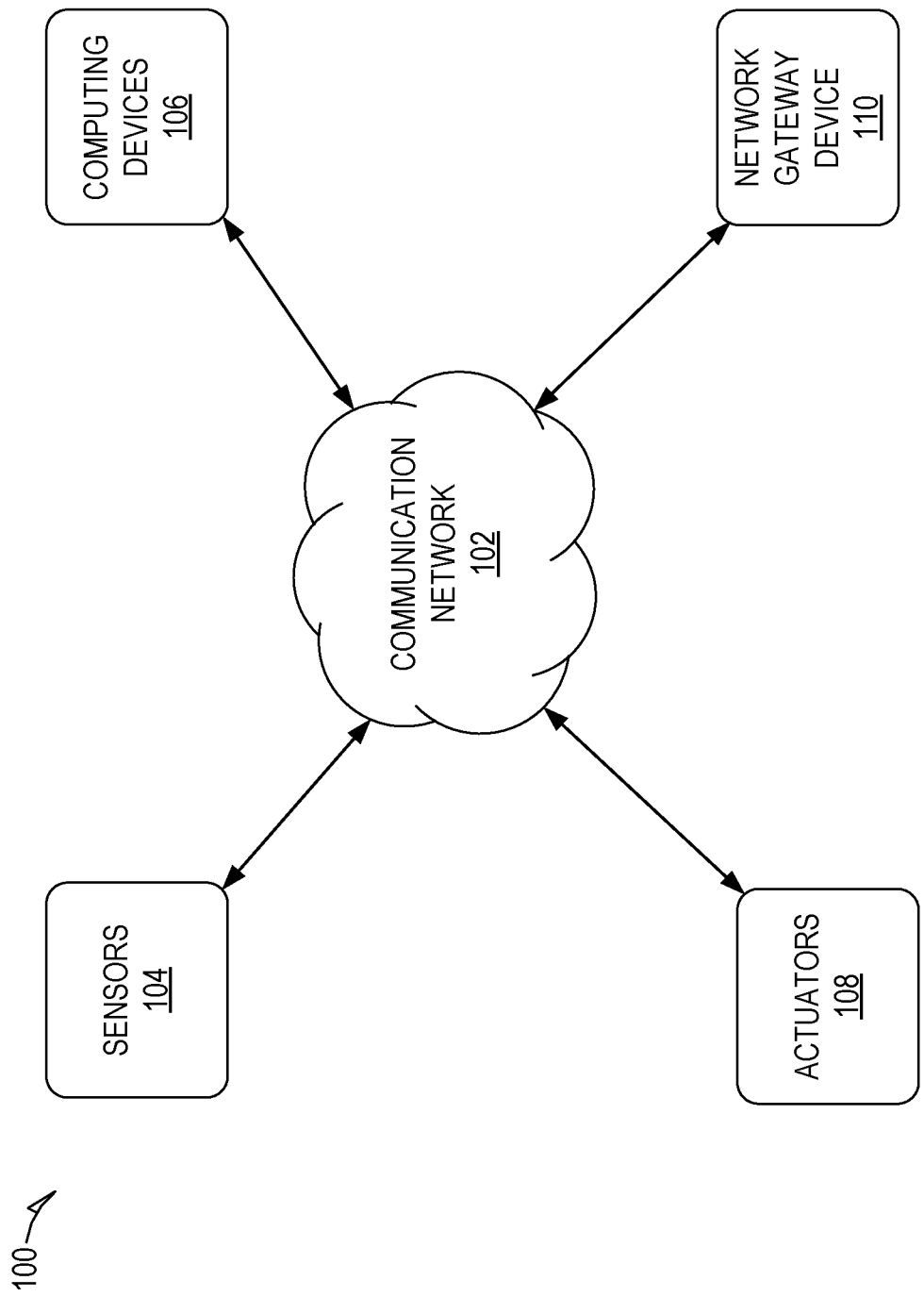
FIG. 1 shows a vehicle networking system, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for a remote vehicle immobilizer. A remote vehicle immobilizer allows for a vehicle to be immobilized remotely to restrict use of the vehicle. For example, the remote vehicle immobilizer includes an electronic switch (e.g., relay) positioned within a conducting path between the starter motor ("starter") and battery of the vehicle. The electronic switch can be controlled remotely to cause the switch to open or close. Opening the electronic switch causes the conducting path between the starter and the battery to be interrupted. As a result, the starter cannot draw power from the battery to ignite the engine of the vehicle and the vehicle is immobilized (e.g., cannot be started using the starter). Conversely, when the electronic switch is closed, the conducting path between the starter and the battery is uninterrupted and the starter may pull power from the battery to ignite the engine of the vehicle and the vehicle is mobilized (e.g., can be started using the starter).

The electronic switch is connected to a network gateway device (e.g., vehicle gateway) of the vehicle that allows for remote communication between the vehicle and one or more remote computing devices of a remote vehicle immobilization system. The network gateway device is a hardware device that acts as a gate to a network and enables traffic to flow in and out of the network to other networks. For example, the network gateway device can be established as an edge device of a network or system of nodes within the vehicle (e.g., vehicle networking system). For example, the network or system of nodes may include a variety of sensors, computing devices (e.g., electronic control units (ECUs), actuators, etc., deployed within the vehicle. The network gateway device facilitates wireless communication capabilities by connecting to wireless networks (e.g., cellular, wireless local area network, satellite communication networks, etc.), for purposes of communicating with remote computing devices. The network gateway device may also provide additional functionality, such as firewall functionality by filtering inbound and outbound communications, disallowing incoming communications from suspicious or unauthorized sources, etc.

Use of the network gateway device allows for a remote computing device to immobilize the vehicle. For example, a remote computing device may transmit a command to the vehicle to cause a change in the configuration of the electronic switch positioned between the starter and battery of the vehicle. That is, the command may cause the configuration of the electronic switch to change from a closed configuration to an open configuration or vice versa. Accordingly, an administrator or other authorized user may use a remote computing device to immobilize a vehicle when desired, such as during times when the vehicle is not scheduled for operation.

The network gateway device also allows for other data to be transmitted between the vehicle and the remote computing device, such as sensor data gathered by sensors of the vehicle. The remote computing device may use the received sensor data to enforce restrictions on use of the vehicle. For example, the remote computing device may use the sensor data to ensure that the vehicle is being operated in an appropriate or desired manner (e.g., within authorized geographic regions, by authorized operators, etc.) and cause immobilization of the vehicle when the vehicle is being operated in an inappropriate or undesired manner (e.g., not within an authorized region).

In some embodiments, the network gateway device is connected to the electronic switch via a two-way communication channel (e.g., Universal Serial Bus (USB)) that allows for communications to be transmitted in both directions. For example, a computing device (e.g., microcontroller) may be implemented at the electronic switch and used to facilitate communications with the network gateway device via the two-way communication channel. This allows data regarding the starter to be provided to the network gateway device, such as notifications indicating occurrences of an attempted engine ignition of the vehicle. The network gateway device may provide this data to a remote computing device.

FIG. 1 shows a vehicle networking system 100, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the vehicle networking system 100 to facilitate additional functionality that is not specifically described herein.

The vehicle networking system 100 is a collection of nodes distributed within a vehicle (e.g., automobile, airplane, ship, etc.), which are interconnected via a communication network 102. The communication network 102 comprises communication links and segments for transporting data between nodes, such as sensors 104, computing devices 106, actuators 108 and a network gateway device 110. Each node in the vehicle networking system 100 may be a redistribution point or an endpoint that can receive, create, store or send data along distributed network routes. For example, each node, whether an endpoint or a redistribution point, can have either a programmed or engineered capability to recognize, process and forward data transmissions to other nodes in the vehicle networking system 100. While the vehicle networking system 100 shows only sensors 104, computing devices 106 actuators 108, and a network gateway device 110, this is not meant to be limiting. The vehicle networking system 100 may include any of a variety of networking nodes, example, of which include sensors 104, displays, actuators 108, computing devices 106, routers, electronic switches, input devices, speakers, etc.

The communication network 102 is implemented using any number of nodes and communications links, including one or more wired communication links, one or more wireless communication links, or any combination thereof. Additionally, the communication network 102 is configured to support the transmission of data formatted using any number of protocols.

Multiple sensors 104, computing devices 106, and actuators 108 can be connected to the communication network 102. A computing device 106 is any type of general computing device capable of network communication with other computing devices. For example, a computing device 106 can include some or all of the features, components, and peripherals of the computing system 1000 shown in FIG. 10.

To facilitate communication with other computing devices 106, a computing device 106 includes a communication interface configured to receive a communication, such as a request, data, and the like, from another computing device 106, sensor 104, actuator 108 or network gateway device 110 in network communication with the computing device 106 and pass the communication along to an appropriate module running on the computing device 106. The communication interface also sends a communication to another computing device 106 sensor 104, actuator 108 or network gateway device 110 in network communication with the computing device 106.

The sensors 104 may be any type of sensors used to capture data. For example, the sensors 104 may include engine speed sensors, fuel temperature sensors, voltage sensors, pressure sensors, radar sensors, light detection and ranking (LIDAR) sensors, imaging sensors (e.g., camera, video camera), etc. The sensors 104 may capture data describing performance of a vehicle and its surroundings and provide the captured data to one or more of the computing devices 106 in the vehicle networking system 100.

The computing devices 106 may use the captured sensor data to provide various computer managed features. For example, the computing devices 106 may use the gathered sensor data to monitor and/or control engine emissions, tire pressure, throttle position, engine temperature, spark plugs, fuel injection, automatic transmission, anti-lock brakes, automated driving, etc. The computing devices 106 may also use the gathered sensor data to provide non-critical luxury functions, such as keyless entry, climate control, motorized seats and mirrors, entertainment system (e.g., radio, compact disk player), cruise control, etc.

The actuators 110 are hardware components that are responsible for executing a mechanical/electrical action, such as moving and controlling a mechanism or system. Examples of actuators 110 include an on/off switch (e.g. door locks, lights, etc.), electric motors (e.g. side mirror, seat and steering wheel control), etc. The computing devices 106 transmit commands to the actuators 108 to perform a specified action. This category of network devices also includes any device that mostly consumes and/or outputs data, such as video displays and audio speakers.

The network gateway device 110 is a hardware device that acts as a gate to a network and enables traffic to flow in and out of the network to other networks. For example, the network gateway device 110 can be established as an edge device of the vehicle networking system 100 to facilitate wireless communication between the vehicle networking system 100 and remote computing devices (not shown). The network gateway device 110 facilitates wireless communication capabilities by connecting to wireless networks (e.g., cellular, wireless local area network, satellite communication networks, etc.), for purposes of communicating with the remote computing devices. The network gateway device 110 may also provide additional functionality, such as firewall functionality by filtering inbound and outbound communications, disallowing incoming communications from suspicious or unauthorized sources, etc.

Figure 2:
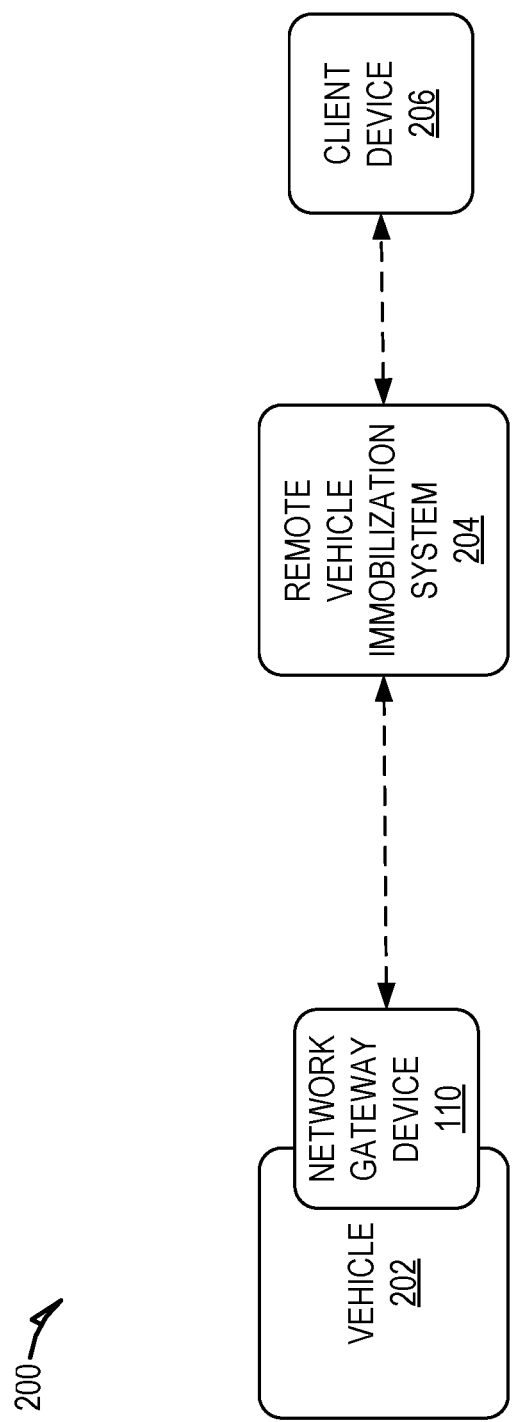
FIG. 2 shows a system for remote vehicle immobilization of a vehicle, according to some example embodiments.

FIG. 2 shows a system 200 for remote vehicle immobilization of a vehicle 202, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 2. However, a skilled artisan will readily recognize that various additional functional components may be supported by the system 200 to facilitate additional functionality that is not specifically described herein.

As shown, a vehicle 202 communicates with a remote vehicle immobilization system 204 via wireless communication facilitated by a network gateway device 110 of the vehicle 202. The remote vehicle immobilization system 204 is a system of one or more computing devices configured to remotely implement/enforce restrictions on use of vehicles 202 in network connection with the remote vehicle immobilization system 204.

The remote vehicle immobilization system 204 enforces restrictions on use of vehicles 202 by remotely causing a vehicle 202 to become immobilized such that the vehicle 202 cannot be started if/when the engine of the vehicle is shut down. For example, the remote vehicle immobilization system 204 may transmit a command to the vehicle 202 to cause an electronic switch positioned between the battery and starter of the vehicle 202 to be configured into an open configuration. As a result, the conducting path between the battery and starter is interrupted and the starter cannot draw power from the battery to ignite the engine of the vehicle 202. While this will not immobilize the vehicle 202 if the engine is ignited at the time the command is received by the vehicle 202, it can prevent the vehicle 202 from being started if/once the engine is shut off.

The remote vehicle immobilization system 204 may similarly transmit a command to the vehicle 202 to cause the electronic switch positioned between the battery and starter of the vehicle 202 to be configured into a closed configuration. As a result, the conducting path between the battery and starter becomes uninterrupted and the starter can draw power from the battery to ignite the engine of the vehicle 202.

The commands transmitted by the remote vehicle immobilization system 204 may be executed manually and/or automatically. For example, an administrator or other authorized user may use a client device 206 (e.g., laptop, desktop computer, smart phone, etc.) to communicate with and utilize the functionality of the remote vehicle immobilization system 204. Accordingly, the administrator or other authorized user may use the client device 206 to manually cause the remote vehicle immobilization system 204 to transmit a command to the vehicle 202.

Alternatively, the remote vehicle immobilization system 204 may automatically transmit commands to the vehicle 202 based on a set of rules, policies and/or received data. For example, the set of rules or policies may dictate a schedule or set times at which vehicles 202 should be immobilized and/or mobilized. Accordingly, the remote vehicle immobilization system 204 may transmit commands to the vehicles 202 based on the schedule.

As another example, the set of rules or policies may dictate conditions that, when triggered, should result in the vehicle 202 being immobilized. For example, the conditions may be based on the location of the vehicle 202, operator of the vehicle 202, etc. The remote vehicle immobilization system 204 may determine if the dictated conditions have been triggered based on data received from the vehicle 202. For example, the network gateway device 110 may gather sensor data from sensors 104 of the vehicle 202 and provide the gathered sensor data to the remote vehicle immobilization system 204 for purposes of enforcing restrictions on use of the vehicle 202.

The sensor data may include any type of data describing the vehicle 202, such as data describing usage of the vehicle, operator of the vehicle 202, surroundings of the vehicle 202, etc. The remote vehicle immobilization system 204 may then use the received sensor data to enforce restrictions on use of the vehicle 202. For example, the remote vehicle immobilization system 204 uses the sensor data to determine whether a condition dictated by the set of rules or policies has been triggered and transmit a command to the vehicle 202 in the event that a condition is triggered. The functionality of the remote vehicle immobilization system 204 is discussed in greater detail below in relation to FIG. 6.

The commands transmitted by the remote vehicle immobilization system 204 to the vehicle 202 are initially received by the network gateway device 110. The network gateway device 110 then transmits subsequent commands to the various nodes (e.g., computing devices 106, sensors 104, actuators 108, etc.) included in the vehicle networking system 100 implemented within the vehicle 202. For example, the network gateway device 110 may transmit a signal to the electronic switch to cause the electronic switch to change configurations from an open configuration to a closed configuration, or vice versa. Examples of the communications between the network gateway device 110 and electronic switch are discussed in greater below in relation to FIG. 4 and FIG. 5.

Figure 3:
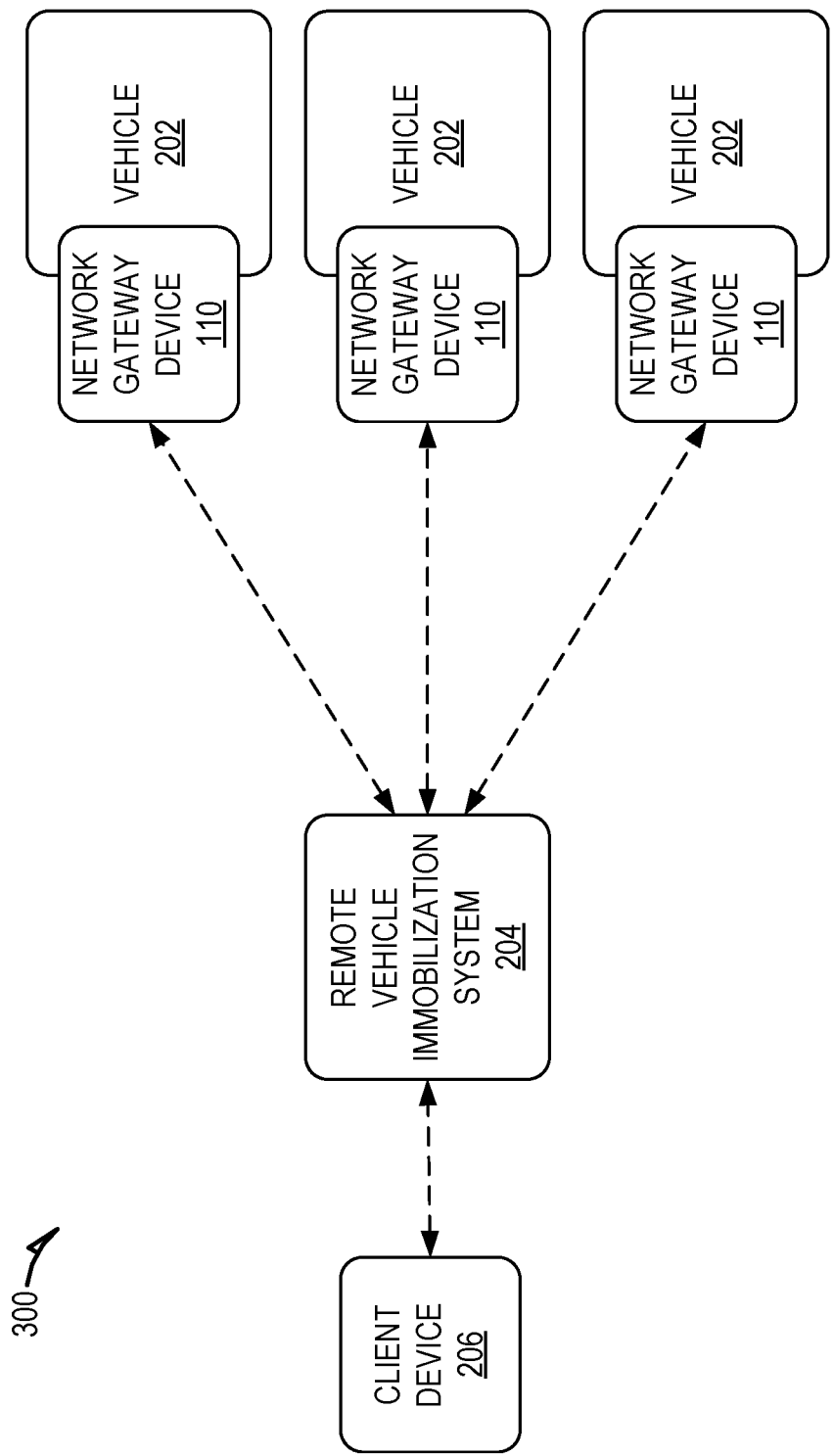
FIG. 3 shows a system for remote vehicle immobilization of multiple vehicles, according to some example embodiments.

FIG. 3 shows a system 300 for remote vehicle immobilization of multiple vehicles 202, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 3. However, a skilled artisan will readily recognize that various additional functional components may be supported by the system 300 to facilitate additional functionality that is not specifically described herein.

As shown, the remote vehicle immobilization system 204 may concurrently communicate with multiple vehicles 202 that are each equipped with a network gateway device 110. Accordingly, the remote vehicle immobilization system 204 may be used to enforce restrictions on multiple vehicles 202. For example, an administrator or other authorized user may use the client device 206 to communicate with the remote vehicle immobilization system 204 and manually cause the remote vehicle immobilization system 204 to transmit commands to multiple vehicles 202 in network communication with the remote vehicle immobilization system 204.

Similarly, the remote vehicle immobilization system 204 may maintain a set of rules or policies to restrict use of multiple vehicles 202. For example, the remote vehicle immobilization system 204 may transmit commands to multiple vehicle 202 based on a schedule dictated by the set of rules or policies. As another example, the remote vehicle immobilization system 204 may receive sensor data from multiple vehicles 202 and use the sensor data to determine whether any conditions dictated by the set of rules or policies have been triggered.

Figure 4:
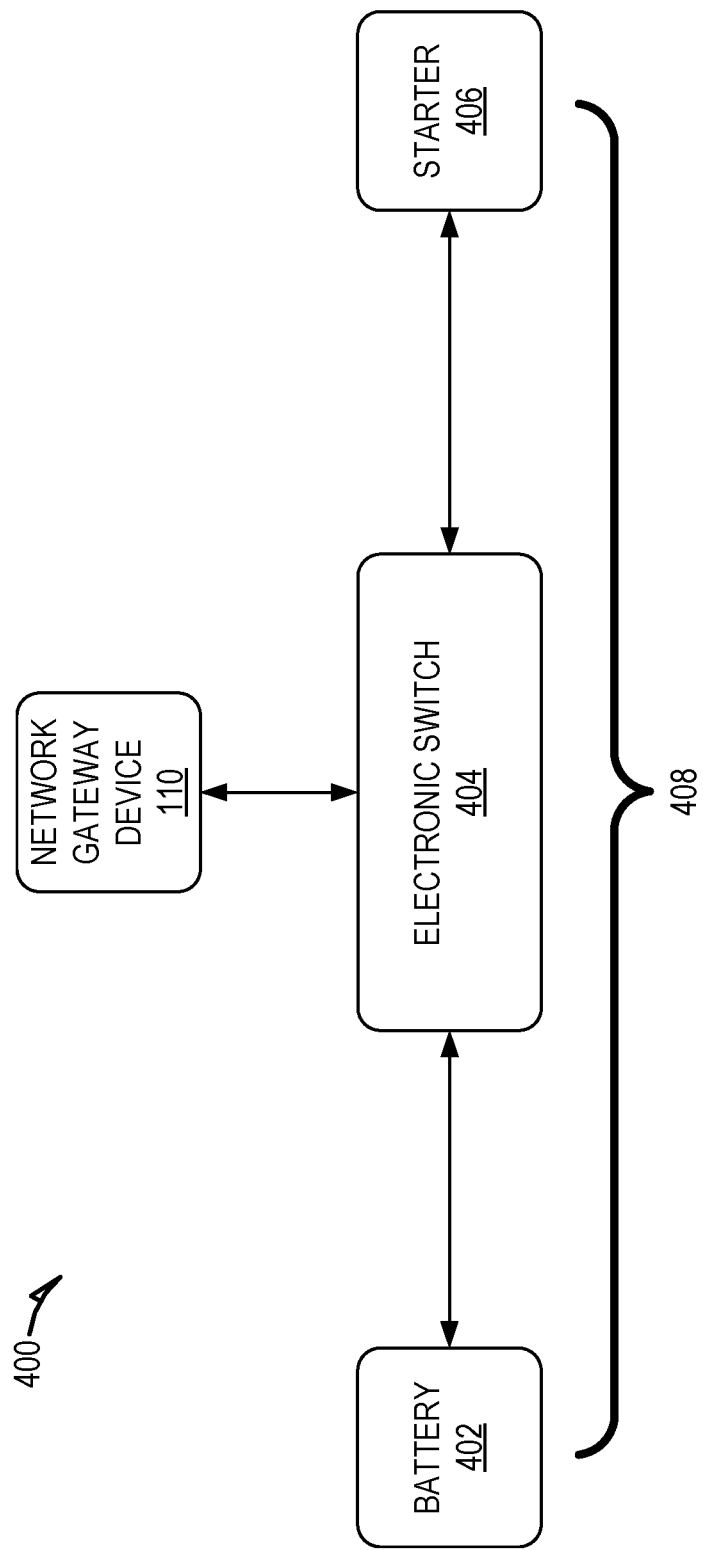
FIG. 4 is a system implemented within a vehicle for remote vehicle immobilization, according to some example embodiments.

FIG. 4 is a system 400 implemented within a vehicle 202 for remote vehicle immobilization, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 4. However, a skilled artisan will readily recognize that various additional functional components may be supported by the system 400 to facilitate additional functionality that is not specifically described herein.

As shown, the system 400 includes a network gateway device 110, a battery 402, an electronic switch 404 and a starter 406. The battery 402 can be any type of power source, such as an automotive battery, used to provide power (e.g., electricity) to mechanical components. The starter 406 is any type of starter motor used to initially ignite an engine (e.g., internal combustion engine) to initiate the engine's operation under its own power. To provide its functionality, the starter 406 draws power from the battery 402 via the conducting path 408 connecting the battery 402 and the starter 406. The electronic switch 404 is any type of electronically operated switch (e.g., relay) that can be configured in an open configuration or a closed configuration to cause an electronic connection between devices connected to the electronic switch 404 to become uninterrupted or interrupted.

As shown, the electronic switch 404 is positioned within the conducting path 408 between the battery 402 and the starter 406. Accordingly, the electronic switch 404 can be used to interrupt the electrical current passing through the conducting path 408 between the battery and the starter 406. For example, the electronic switch 404 may be configured in a closed configuration to provide an uninterrupted conducting path 408 between the battery 402 and the starter 405, or an open configuration to interrupt the conducting path 408 between the battery 402 and the starter 405. When the conducting path 408 is uninterrupted (e.g., the electronic switch 404 is in a closed configuration), the starter 406 can pull power from the battery 402 via the conducting path 408. Alternatively, when the conduction path 408 is interrupted (e.g., the electronic switch 404 is in an open configuration), the starter 406 cannot pull power from the battery 402 via the conducting path 408.

The network gateway device 110 is connected to the electronic switch 404 and communicates with the electronic switch 404 via the connection for purposes of modifying the configuration of the electronic switch 404. For example, the network gateway device 110 may transmit a signal or command to the electronic switch 404 to cause the electronic switch 404 to change configuration from an open configuration to a closed configuration, or vice versa.

As explained previously, the network gateway device 110 allows for wireless communication with the remote vehicle immobilization system 204. Accordingly, the remote vehicle immobilization system 204 may transmit commands to the network gateway device 110 to immobilize or mobilize the vehicle 202. In turn, the network gateway device 110 may transmit a command or signal to the electronic switch 404 to cause a change to the configuration of the electronic switch 404, such as by causing the electronic switch 404 to be configured in an open configuration or a closed configuration.

The network gateway device 110 may be connected to and communicate with the electronic switch 404 using any of a variety of connections. In some embodiments, however, the network gateway device 110 is connected using a two-way communication channel (e.g., USB) that allows for communications to be transmitted in both directions. Accordingly, the network gateway device 110 may transmit commands to the electronic switch 404 as well as receive data via the two-way communication channel.

Figure 5:
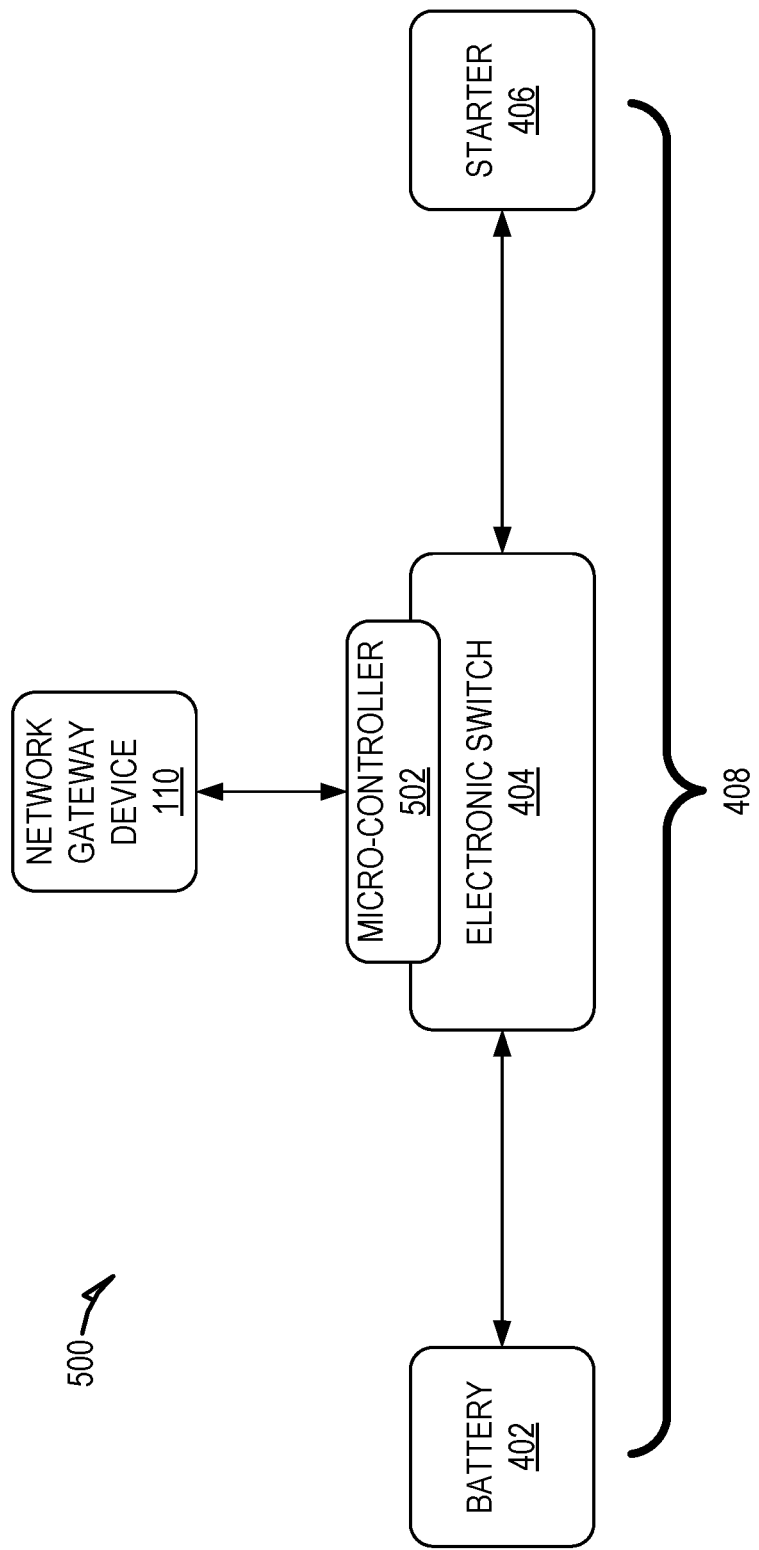
FIG. 5 is a system implemented within a vehicle for remote vehicle immobilization using a two-way communication channel, according to some example embodiments.

FIG. 5 is a system 500 implemented within a vehicle 202 for remote vehicle immobilization using a two-way communication channel, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 5. However, a skilled artisan will readily recognize that various additional functional components may be supported by the system 500 to facilitate additional functionality that is not specifically described herein.

As shown, the network gateway device 110 communicates with a micro-controller 502 that is connected to the electronic switch 404 and/or one or more points of the conducting path 408. The micro-controller 502 may transmit data to the network gateway device 110 via the two-way communication channel. For example, the micro-controller 502 may transmit a notification to the network gateway device 110 in response to detecting occurrence of specified events, such as an attempt to use the starter to ignite the engine of the vehicle 202. The micro-controller 502 may transmits the notifications to the network gateway device 110, which in turn may forward the notification to the remote vehicle immobilization system 204.

Figure 6:
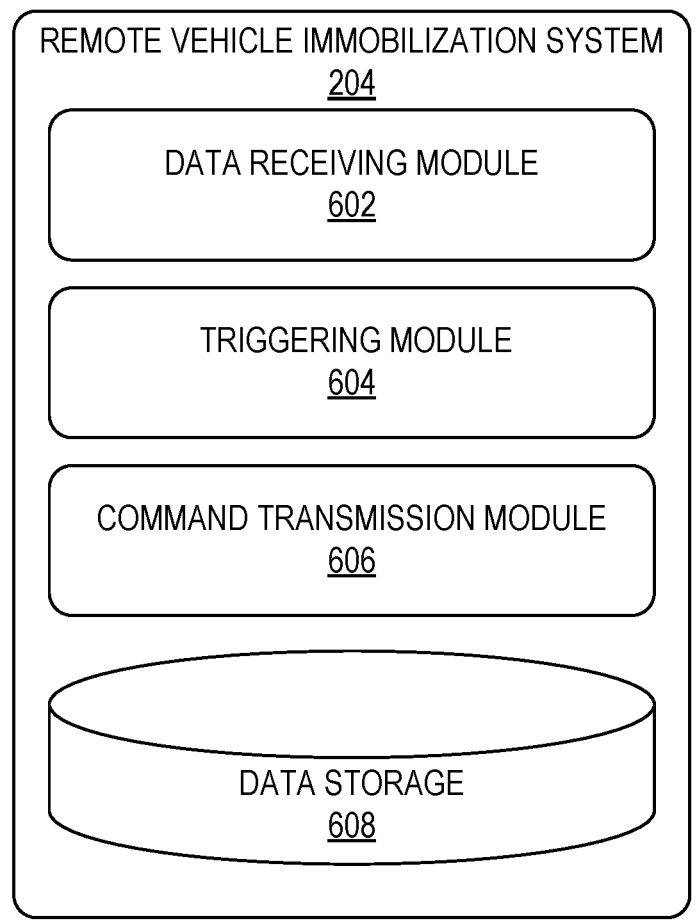
FIG. 6 is a block diagram of a remote vehicle immobilization system, according to some example embodiments.

FIG. 6 is a block diagram of a remote vehicle immobilization system 204, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 6. However, a skilled artisan will readily recognize that various additional functional components may be supported by the remote vehicle immobilization system 204 to facilitate additional functionality that is not specifically described herein.

As shown, the remote vehicle immobilization system 204 includes a data receiving module 602, a triggering module 604, a command transmission module 606, and a data storage 608. The data receiving module 602 receives sensor data from vehicles 202 in network communication with the remote vehicle immobilization system 204. For example, the vehicles 202 may include a network gateway device 110 that facilitates wireless communication with the remote vehicle immobilization system 204. The network gateway device 110 gathers sensor data from sensors 104 of the vehicle 202 and transmits the sensor data to the remote vehicle immobilization system 204.

The sensor data may include any type of data describing the performance, condition and/or surrounding of the vehicle 202 or operator of the vehicle 202. For example, the sensor data may include data describing the current speed and/or trajectory of the vehicle 202. As another example, the sensor data may include data describing the current operator of the vehicle 202, such as an identifier identifying the operator, a blood alcohol level of the operator, eye gaze of the operator, etc. As another example, the sensor data may include data describing the current geographic location of the vehicle 202. These are just some examples of the types of sensor data that may be received by the data receiving module 602 and are not meant to be limiting.

The data receiving module 602 may provide the received sensor data to other modules of the remote vehicle immobilization system 204 and/or store the sensor data in the data storage 608. The sensor data stored in the data storage 608 may be associated with the vehicle 202 from which the sensor data was received. For example, the sensor data may be associated with a unique identifier associated with the vehicle 202.

The triggering module 604 determines when a command should be transmitted to a vehicle 202 to immobilize or mobilize the vehicle 202 based on the sensor data received from the vehicle and/or a set of rules or policies. The set or rules or policies dictate conditions for immobilizing or mobilizing a vehicle 202. For example, the set of rules or policies may dictate a schedule or specific times at which vehicles 202 should be immobilized and/or mobilized. As another example, the set of rules or policies may dictate conditions to be determined based on sensor data for immobilizing and/or mobilizing a vehicle 202. For example, the conditions may be based on the operator of the vehicle 202, the current geographic location of the vehicle 202, a current condition of the vehicle 202, etc.

The set of rules or policies may include a list of conditions and corresponding actions to be executed in response to the condition being met. Each listed condition may consist of one or more separate conditions that are to be met for the corresponding action to be triggered. For example, a single condition may dictate that a vehicle 202 be immobilized if the current geographic location of the vehicle 202 is determined to be outside of an authorized geographic location. As another example, a single condition may dictate that a vehicle 202 be mobilized if the current geographic location of the vehicle 202 is determined to be within an authorized geographic area and the vehicle 202 is being operated by an authorized user.

The triggering module 604 may access the sensor data for a vehicle 202 from the data receiving module 602 and/or data storage 608 and use the sensor data to determine whether any conditions dictated by the set of rules or policies have been met. In the event that the triggering module 604 determines that a condition has been met, the triggering module 604 instructs the command transmission module 606 to trigger the corresponding action, such as transmitting a command the vehicle 202 to either immobilize or mobilize the vehicle 202. In response, the command transmission module 606 transmits a command to the vehicle 202 to perform the specified action, such as by causing the electronic switch 404 to be configured in a closed configuration or open configuration.

As explained earlier, the set of rules or policies may dictate a variety of types of conditions based on single or multiple factors. For example, in some embodiments, the conditions may be time-based conditions that dictate times at which a vehicle 202 should be immobilize and/or mobilized. This type of condition allows for vehicles 202 to be immobilized during hours when the vehicle is not scheduled for operation.

In some embodiments, the conditions may be based on data about the operator of the vehicle 202 to ensure that the operator is in a proper condition to operate the vehicle 202. For example, the vehicle 202 may include a sensor, such as an Radio Frequency Identifier (RFID) sensor that gathers an RFID from a badge identifying the operator and/or cameras that capture images of the operator of the vehicle. This data allows for the remote vehicle immobilization system 204 to identify the operator of the vehicle and/or other persons in the vehicle, which can be used to enforce restrictions on use of the vehicle 202. For example, a condition may dictate a list of operators and/or RFIDs that are authorized and/or not authorized to operate the vehicle 202. Accordingly, the condition may dictate that the vehicle 202 be immobilized if the operator is not authorized and/or the vehicle 202 be mobilized if the operator is authorized.

As another example, a condition may dictate a limit on the amount of time that an operator may operate a vehicle, such as daily limit, weekly limit, continuous operation limit, etc. The remote vehicle immobilization system 204 may use the RFID and/or image data received from the vehicle 202 to identify the operator and determine a number of hours the operator has been operating the vehicle 202. The remote vehicle immobilization system 204 may compare the number of hours to a threshold number to determine whether the operator has exceeded the limit designated by the condition.

As another example, a condition may dictate a limit a number of the number of people that may be present in the vehicle 202 while the vehicle 202 is being operated. The remote vehicle immobilization system 204 may use the RFID and/or image data received from the vehicle 202 to determine the number of people present within the vehicle 202 and compare the number of people to a threshold number of people dictated by the condition. The condition may dictate that the vehicle 202 be immobilized if the number of people exceeds the threshold and/or that the vehicle be mobilized if the number of people is below the threshold.

As another example, the remote vehicle immobilization system 204 may receive sensor data indicating the blood alcohol level of the operator of the vehicle 202 and compare the blood alcohol level to a threshold level. For example, one of the sensors 104 of the vehicle 202 may be a blood alcohol sensor that an operator uses when attempting to operate the vehicle 202. The blood alcohol level captured by the sensor 104 may be provided to the remote vehicle immobilization system 204, which may use the provided sensor data to enforce safety restrictions in relation to the vehicle 202. For example, the remote vehicle immobilization system 204 may immobilize and/or determine that the vehicle 202 should not be mobilized if the blood alcohol level is determined to above a threshold level. Similarly, the remote vehicle immobilization system 204 may mobilize the vehicle 202 if the blood alcohol level is below the threshold level.

In some embodiments, the remote vehicle immobilization system 204 may use sensor data describing usage of the vehicle 202 to determine whether the vehicle 202 is being operated in a safe manner. For example, the remote vehicle immobilization system 204 may use sensor data such as the speed and trajectory of the vehicle 202, as well as the geographic location of the vehicle 202 to determine whether the vehicle 202 is being operated safely. The remote vehicle immobilization system 204 may use the current geographic location of the vehicle 202 to determine acceptable operating conditions for the vehicle 202, such as the speed limit, type of road, terrain, etc., associated with the current geographic location of the vehicle 202. The remote vehicle immobilization system 204 may then use the sensor data to determine whether the vehicle 202 is being operated within the acceptable operating conditions determined based on the current geographic location of the vehicle 202. The remote vehicle immobilization system 204 may immobilize the vehicle 202 if the vehicle 202 is not being operated within the acceptable operating conditions.

As another example, the remote vehicle immobilization system 204 may determine to immobilize a vehicle 202 based on a current account status associated with the operator of the vehicle 202. For example, in situations in which a vehicle 202 is rented to an operator or is otherwise associate with a license agreement, the vehicle 202 may be immobilized if the operator has not returned the vehicle 202 within an agreed time frame, made the adequate payments, and/or otherwise violated terms of the rental/license agreement.

These are just a few examples of rules and policies that may be enforced by the remote vehicle immobilization system 204, however these examples are not meant to be limiting. The remote vehicle immobilization system 204 may enforce restrictions based on any type or combination of factors and this disclosure anticipates all such possibilities.

Figure 7:
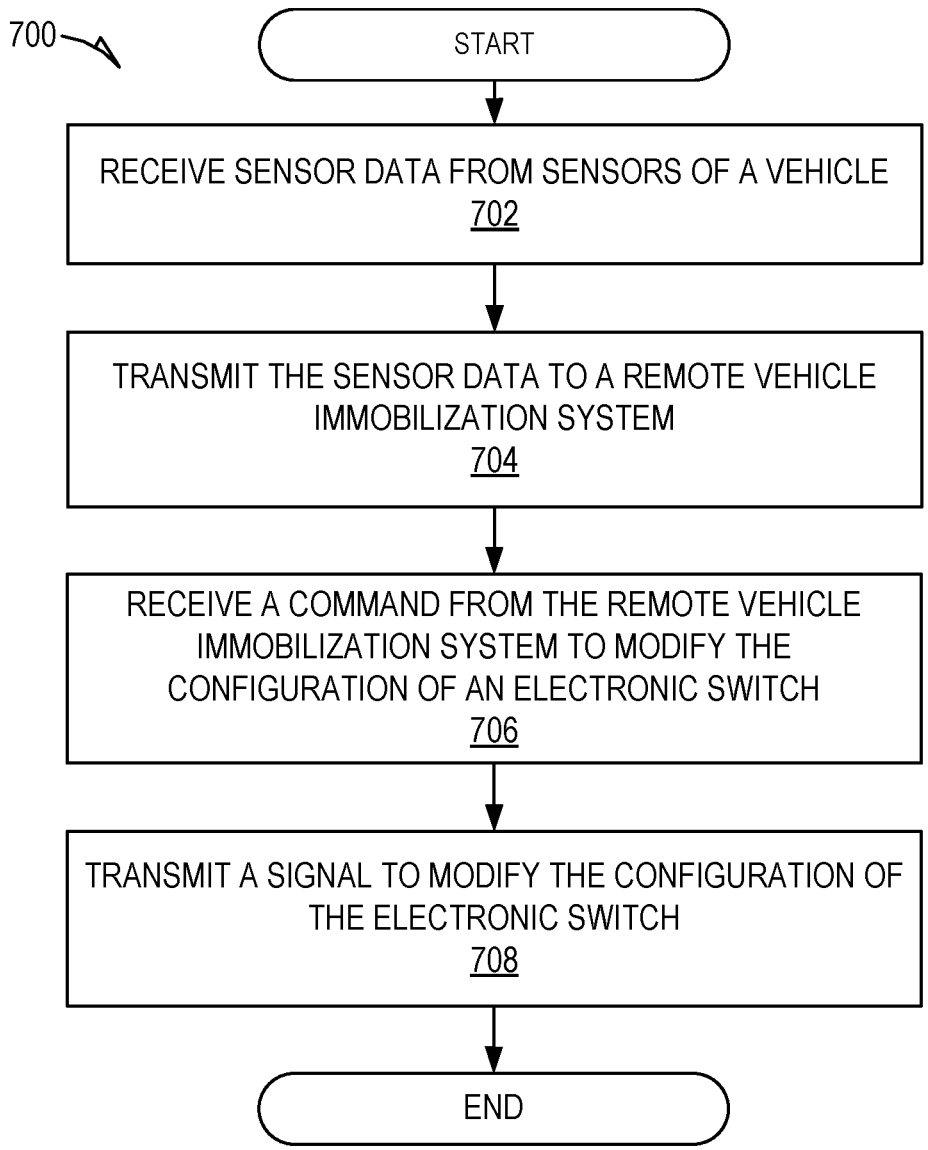
FIG. 7 is a flowchart showing a method for remote vehicle immobilization, according to some example embodiments.

FIG. 7 is a flowchart showing a method 700 for remote vehicle immobilization, according to some example embodiments. The method 700 may be embodied in computer readable instructions for execution by one or more processors such that the operations of the method 700 may be performed in part or in whole by the network gateway device 110; accordingly, the method 700 is described below by way of example with reference thereto. However, it shall be appreciated that at least some of the operations of the method 700 may be deployed on various other hardware configurations and the method 700 is not intended to be limited to the network gateway device 110.

At operation 702, the network gateway device 110 receives sensor data from sensors 104 of a vehicle 202. The sensor data may include any type of data describing the state, performance and/or usage of the vehicle 202 and/or operator of the vehicle.

At operation 704, the network gateway device 110 transmits the sensor data to a remote vehicle immobilization system 204. The remote vehicle immobilization system 204 enforces restrictions on use of vehicles 202. The restrictions may be enforced to provide additional safety or security of the vehicle 202. For example, the restrictions can be used to ensure that the vehicle is being operated in a safe and authorized manner and/or that the operator of the vehicle 202 is in an acceptable state to properly operate the vehicle 202.

At operation 706, the network gateway device 110 receives a command from the remote vehicle immobilization system 204 to modify the configuration of an electronic switch 404. The electronic switch 404 is positioned within a conducting path 408 between a battery 402 and starter 406 of the vehicle 202. The configuration of the electronic switch 404 may be modified to mobilize or immobilize the vehicle 202. For example, the electronic switch may be configured in a closed configuration to provide an uninterrupted conducting path 408 between the battery 402 and the starter 405, or an open configuration to interrupt the conducting path 408 between the battery 402 and the starter 405. When the conducting path 408 is uninterrupted (e.g., the electronic switch 404 is in a closed configuration), the starter 406 can pull power from the battery 402 via the conducting path 408 and is thus the vehicle 202 is mobilized. Alternatively, when the conduction path 408 is interrupted (e.g., the electronic switch 404 is in an open configuration), the starter 406 cannot pull power from the battery 402 via the conducting path 408 and thus the vehicle 202 is immobilized.

At operation 708, the network gateway device 110 transmits a signal to modify the configuration of the electronic switch 404. The signal causes the electronic switch 404 to change its configuration, such as from an open configuration to a closed configuration, or vice versa.

Figure 8:
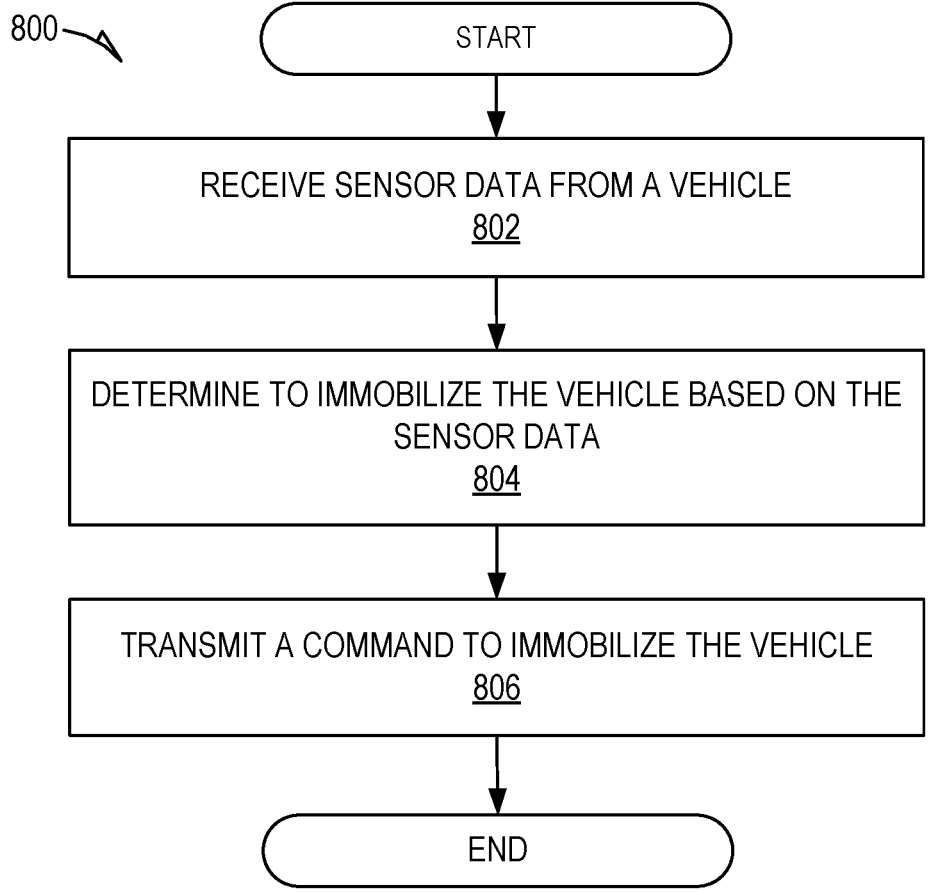
FIG. 8 is a flowchart showing a method of remotely immobilizing a vehicle, according to some example embodiments.

FIG. 8 is a flowchart showing a method 800 of remotely immobilizing a vehicle, according to some example embodiments. The method 800 may be embodied in computer readable instructions for execution by one or more processors such that the operations of the method 800 may be performed in part or in whole by the remote vehicle immobilization system 204; accordingly, the method 800 is described below by way of example with reference thereto. However, it shall be appreciated that at least some of the operations of the method 800 may be deployed on various other hardware configurations and the method 800 is not intended to be limited to the remote vehicle immobilization system 204.

At operation 802, the data receiving module 602 receives sensor data from a vehicle 202. The vehicle 202 may include a network gateway device 110 that facilitates wireless communication with the remote vehicle immobilization system 204. The network gateway device 110 gathers sensor data from sensors 104 of the vehicle 202 and transmits the sensor data to the remote vehicle immobilization system 204.

The sensor data may include any type of data describing the performance, condition and/or surrounding of the vehicle 202 or operator of the vehicle 202. For example, the sensor data may include data describing the current speed and/or trajectory of the vehicle 202. As another example, the sensor data may include data describing the current operator of the vehicle, such as an identifier identifying the operator, a blood alcohol level of the operator, eye gaze of the operator, etc. As another example, the sensor data may include data describing the current geographic location of the vehicle 202. These are just some examples of the types of sensor data that may be received by the data receiving module 602 and are not meant to be limiting.

The data receiving module 602 may provide the received sensor data to other modules of the remote vehicle immobilization system 204 and/or store the sensor data in the data storage 608. The sensor data stored in the data storage 608 may be associated with the vehicle 202 from which the sensor data was received. For example, the sensor data may be associated with a unique identifier associated with the vehicle 202.

At operation 804, the triggering module 604 determines to immobilize the vehicle 202 based on the sensor data. The triggering module 604 determines when a command should be transmitted to a vehicle 202 to immobilize or mobilize the vehicle 202 based on the sensor data received from the vehicle and/or a set of rules or policies. The set or rules or policies dictate conditions for immobilizing or mobilizing a vehicle 202. For example, the set of rules or policies may dictate a schedule or set times at which vehicles 202 should be immobilized and/or mobilized. As another example, the set of rules or policies may dictate conditions to be determined based on sensor data for immobilizing and/or mobilizing a vehicle 202. For example, the conditions may be based on the operator of the vehicle 202, the current geographic location of the vehicle 202, a current condition of the vehicle 202, etc.

The set of rules or policies may include a list of conditions and corresponding actions to be executed in response to the condition being met. Each listed condition may consist of one or more separate conditions that are to be met for the corresponding action to be triggered. For example, a single condition may dictate that a vehicle 202 be immobilized if the current geographic location of the vehicle 202 is determined to be outside of an authorized geographic location. As another example, a single condition may dictate that a vehicle 202 be mobilized if the current geographic location of the vehicle is determined to be within an authorized geographic area and the vehicle 202 is being operated by an authorized user.

The triggering module 604 may access the sensor data for a vehicle 202 from the data receiving module 602 and/or data storage 608 and use the sensor data to determine whether any conditions dictated by the set of rules or policies have been met. In the event that the triggering module 604 determines that a condition has been met, the triggering module 604 instructs the command transmission module 606 to trigger the corresponding action, such as transmitting a command to the vehicle 202 to either immobilize or mobilize the vehicle.

At operation 806, the command transmission module 606 transmits a command to immobilize the vehicle 202. The command transmission module 606 transmits the command to the vehicle 202, which is received by a network gateway device 110 of the vehicle 102. The network gateway device 110 may then transmit a subsequent signal or command to an electronic switch 404 positioned between the battery 402 and starter 406 of the vehicle 202. The subsequent signal or command causes the electronic switch 404 to be configured in an open configuration, thereby interrupting a conducting path 408 between the battery 402 and the starter 406. As a result, the starter 406 cannot pull power form the battery 402 and the vehicle 202 is immobilized.

Software Architecture

Figure 9:
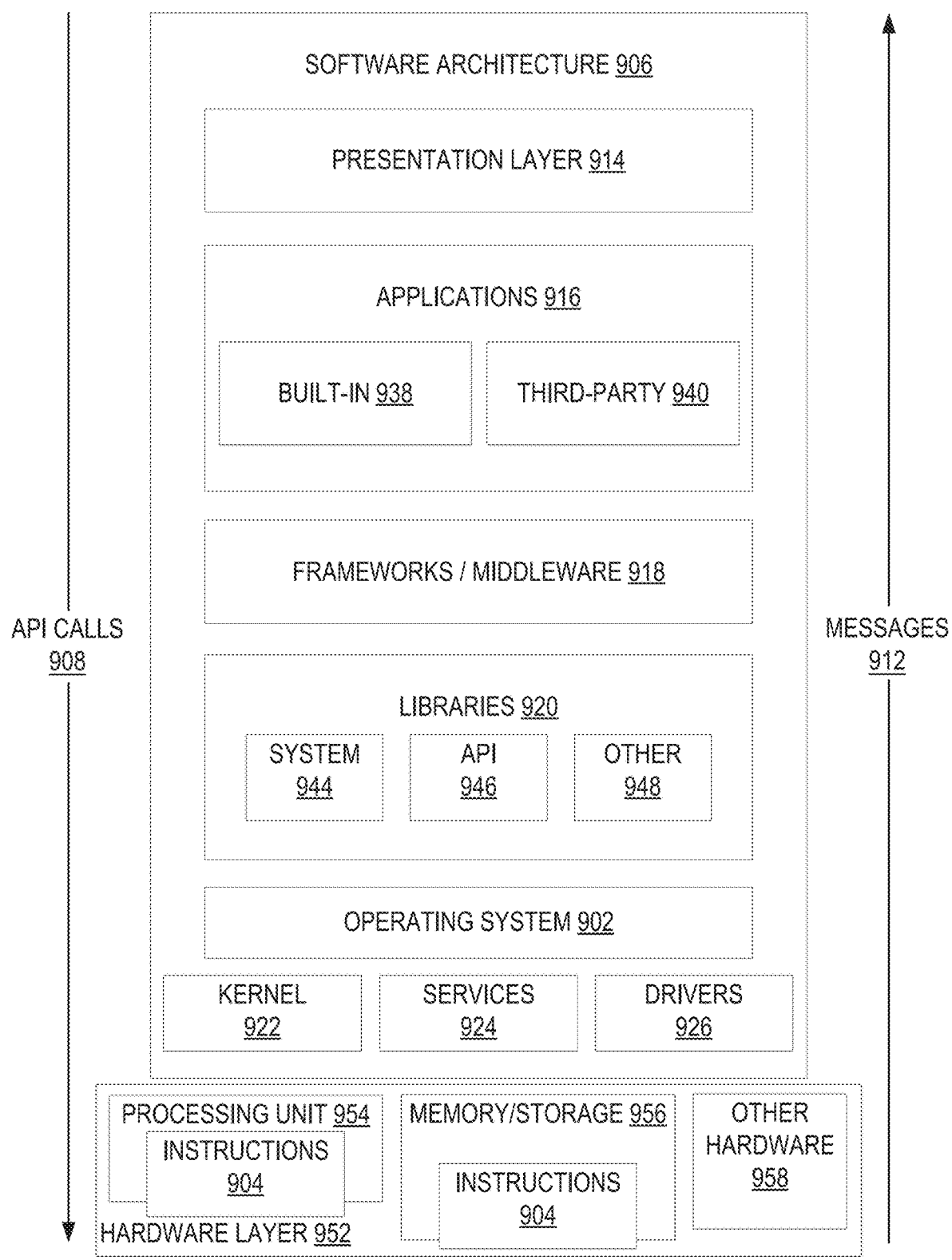
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
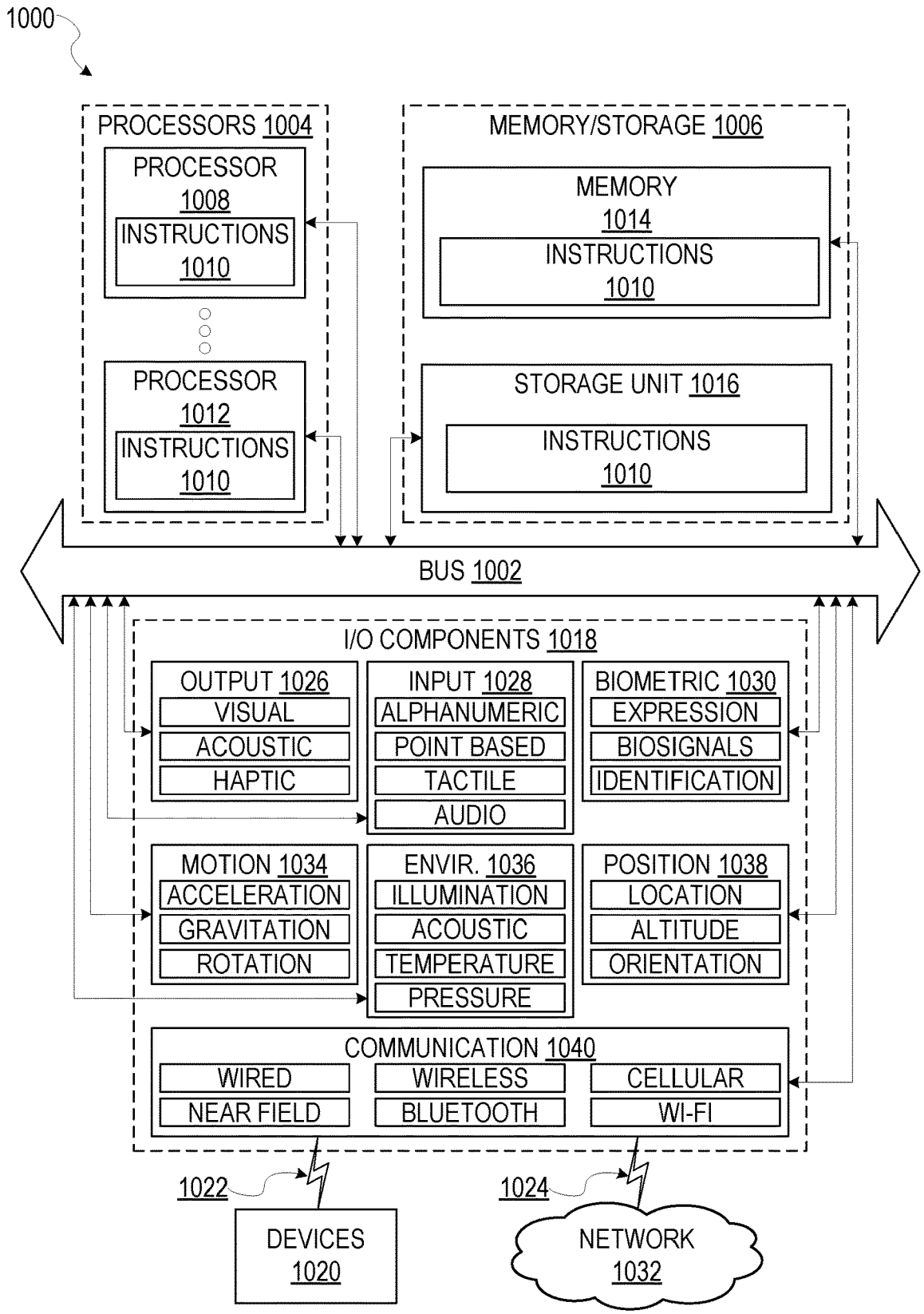
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth. GLOSSARY "CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
accessing an operation policy associated with a vehicle, the operation policy defining a configuration of an electronic switch associated with the vehicle based on a schedule, the electronic switch positioned within the vehicle in a conducting path between a starter motor of the vehicle and a battery of the vehicle;
determining, by a processor, an operation mode of the vehicle based on the operation policy and the schedule; and
causing the vehicle to modify the configuration of the electronic switch from a first configuration to a second configuration based on the operation mode of the vehicle.

2. The method of claim 1, wherein the first configuration includes a closed configuration that creates an uninterrupted connection along the conducting path between the starter motor and the battery.

3. The method of claim 1, wherein the second configuration includes an open configuration that creates an interruption within the conducting path between the starter motor and the battery.

4. The method of claim 1, wherein the operation policy defines the configuration of the electronic switch associated with the vehicle based on the schedule and a trigger condition, and wherein the determining the operation mode of the vehicle includes:
receiving sensor data that indicates an occurrence of the trigger condition; and
causing the vehicle to modify the configuration based on the schedule and the trigger condition.

5. The method of claim 4, wherein the trigger condition includes geolocation criteria.

6. The method of claim 4, wherein the trigger condition includes a determination that a current operator of the vehicle is not an authorized operator.

7. The method of claim 4, wherein the receiving the sensor data includes receiving the sensor data via a Radio-Frequency Identification (RFID) sensor.

8. A system comprising:
one or more computer processors; and
one or more computer-readable mediums storing instructions that, when executed by the one or more computer processors, cause the system to perform operations comprising:
accessing an operation policy associated with a vehicle, the operation policy defining a configuration of an electronic switch associated with the vehicle based on a schedule, the electronic switch positioned within the vehicle in a conducting path between a starter motor of the vehicle and a battery of the vehicle;
determining an operation mode of the vehicle based on the operation policy and the schedule; and
causing the vehicle to modify the configuration of the electronic switch from a first configuration to a second configuration based on the operation mode of the vehicle.

9. The system of claim 8, wherein the first configuration includes a closed configuration that creates an uninterrupted connection along the conducting path between the starter motor and the battery.

10. The system of claim 8, wherein the second configuration includes an open configuration that creates an interruption within the conducting path between the starter motor and the battery.

11. The system of claim 8, wherein the operation policy defines the configuration of the electronic switch associated with the vehicle based on the schedule and a trigger condition, and wherein the determining the operation mode of the vehicle includes:

receiving sensor data that indicates an occurrence of the trigger condition; and causing the vehicle to modify the configuration based on the schedule and the trigger condition.

12. The system of claim 11, wherein the trigger condition includes geolocation criteria.

13. The system of claim 11, wherein the trigger condition includes a determination that a current operator of the vehicle is not an authorized operator.

14. The system of claim 11, wherein the receiving the sensor data includes receiving the sensor data via a Radio-Frequency Identification (RFID) sensor.

15. A non-transitory computer-readable medium storing instructions that, when executed by one or more computer processors of one or more computing devices, cause the one or more computing devices to perform operations comprising:

accessing an operation policy associated with a vehicle, the operation policy defining a configuration of an electronic switch associated with the vehicle based on a schedule, the electronic switch positioned within the vehicle in a conducting path between a starter motor of the vehicle and a battery of the vehicle;

determining an operation mode of the vehicle based on the operation policy and the schedule; and causing the vehicle to modify the configuration of the electronic switch from a first configuration to a second configuration based on the operation mode of the vehicle.

16. The non-transitory computer-readable medium of claim 15, wherein the first configuration includes a closed configuration that creates an uninterrupted connection along the conducting path between the starter motor and the battery.

17. The non-transitory computer-readable medium of claim 15, wherein the second configuration includes an open configuration that creates an interruption within the conducting path between the starter motor and the battery.

18. The non-transitory computer-readable medium of claim 15, wherein the operation policy defines the configuration of the electronic switch associated with the vehicle based on the schedule and a trigger condition, and wherein the determining the operation mode of the vehicle includes:

receiving sensor data that indicates an occurrence of the trigger condition; and causing the vehicle to modify the configuration based on the schedule and the trigger condition.

19. The non-transitory computer-readable medium of claim 18, wherein the trigger condition includes geolocation criteria.

20. The non-transitory computer-readable medium of claim 18, wherein the trigger condition includes a determination that a current operator of the vehicle is not an authorized operator.

* * * * *